Nov. 16, 1954  E. J. ROGERS ET AL  2,694,245
MOLDING OF CERAMICS

Filed Nov. 28, 1950  2 Sheets-Sheet 1

INVENTORS.
Edwin J. Rogers
Edward L. Mooney
BY
Dale A. Bauer
ATTORNEY

United States Patent Office 2,694,245
Patented Nov. 16, 1954

2,694,245

MOLDING OF CERAMICS

Edwin J. Rogers, Sidney, and Edward L. Mooney, Norwich, N. Y., assignors to Bendix Aviation Corporation, New York, N. Y., a corporation of Delaware Application November 28, 1950, Serial No. 197,908

24 Claims. (Cl. 25—156)

This invention is a continuation in part of my prior application Serial No. 15,866, now forfeited, filed March 19, 1948.

This invention relates to the molding of ceramics, particularly to molding ceramics under pressure, and to molding ceramics by extrusion molding processes. The invention will be described in its application to the extrusion molding of a spark plug insulator, but that is only one instance of its general utility.

Extrusion molding is widely practiced in the plastics field, but is much more difficult when applied to ceramics. the plastics are homogeneous and tend to flow under pressure and heat whereas the ceramic materials are often in sand-like, irregular, high-frictional particles that tend to pack when pressure is applied, not to flow. Lubricants somewhat reduce the packing, but some tend to remain partly or wholly in the piece as undesired adulterants, others cause fissures to appear during firing, some stick to the mold, and some flow irregularly, too much or too little.

It is an object of this invention to mold ceramic shapes and particularly by injection molding, and to improve the appearance and strength of ceramic articles by reducing the strains and stains that appear during manufacture.

Other objects are to mold ceramic shapes containing, as a major constituent, alumina, and to reduce blistering.

Another object is to prevent the building up of internal pressure in ceramic masses containing materials, other than ceramic, which vaporize during firing, to prevent the formation, in molded ceramics, of external or internal fissures or places of strain that cause the loss of pieces during manufacture, the occurrence of which is a material loss to the ceramics industry, or which may cause electrical or mechanical failure of the piece during heavy use.

Another object is to produce ceramic forms of even density, and to prevent the building up of local centers of pressure due to uneven flow of the ceramic. To this end a novel mold is provided at its remote parts with pressure vents so small that they do not harmfully reduce the pressure that forces the mix to fill the mold but do permit some relative movement of the ceramic grains up to the end of the molding operation.

The objects of the invention are attained, generally speaking, by making a preform, which may be, for instance, a flat, circular cake containing the ceramic, a bonding material, and pore forming vaporizing agents volatilizing continuously or in selected sequence from low to high temperature, heating the cake to a molding temperature, extruding the cake at good molding temperature into a mold of the desired shape, preferably a cold mold, cooling the molded product, and firing the said product at progressively increasing temperature so as to form pores, and keep them open, by the progressive vaporization of the pore forming agents. The composition of the preform is an important part of the invention that facilitates the escape of the non-ceramic ingredients and produces an uncracked piece of very even density and close conformity to the precise shape of the mold.

The requirements for the ceramic insulators of spark plugs are most exacting because of the conditions to which they are subjected. Minute or invisible flaws can cause failure in operation. Consequently, the invention has been extensively tested in this exacting field. Ceramic requirements for alumina insulators of good quality are set forth in Patent 2,423,958.

In carrying out the invention ceramic powder, which may be of such composition as are those of the said patent, or of other composition, is mixed with powdered polystyrene in a roll mill, or a hot mixer for example, and molded at a suitable temperature into a preform and allowed to cool. The preforms may be transported to the place of sale or use.

The use of polystyrene is believed to be unique. It gives free flow of the ceramic mix at convenient temperatures of operation; it mixes evenly; it is removable from a mold without sticking, and it is capable of escaping from the molded shape without rupturing it when used according to the invention. We have discovered that it does not suffice to use polystyrene or any other resin alone, but that for the best results the preform should contain the resin, some oil or wax having a vaporizing point in the range of beeswax and hydrogenated peanut oil (circa 300–375° F.), which are preferred examples, and a lighter, more volatile oil. The light oil may be animal, vegetable or mineral.

The theory for the action of this composition is that the volatile oil vaporizes first as the shape is fired, opening up the ceramic by forming minute pores extending to its very center, and escaping uniformly. The oil or wax vaporizes next and escapes through the minute and evenly distributed pores formed by the light oil. Finally, at sufficiently high temperature the polystyrene passes off, probably in the form of decomposition products, through the same pores. There is thus established a train of vaporization beginning at a rather low temperature circa 150° F., and extending up to the temperature at which the polystyrene begins to come out of the shape. More than two oils or waxes, volatilizing in sequence, can be used, if desired, in the chain.

In addition to hydrogenated peanut oil, which is best, and beeswax, which is of excellent quality and can be substituted for the hydrogenated peanut oil in similar or even identical amounts, other examples of the useful oils and waxes are carnauba wax, and acrawax, acrawax B, and acrawax C (which is a modified polyamide of stearic acid) which although they are not regarded as the full equivalent of beeswax or hydrogenated peanut oil can be employed with some success. The acrawaxes are apparently comprised of alkyl stearimides.

Illustrative successful compositions for a preform are shown in the examples.

In the drawings, wherein like reference characters refer to like parts throughout the several views, Fig. 1 of the drawing is a diagrammatic vertical section through an injection mold;

EXAMPLE 1

*Ingredients*

.52 part polystyrene, powdered to 200 mesh or less.
.27 part light oil volatilizing between 125° and 300° F.
.11 part hydrogenated peanut oil, which volatilizes between 300 and 375° F.
3.00 parts ceramic, powdered to 200 mesh or less, but of non-uniform particle size.

*Process*

The ceramic body may be composed of tricalcium penta aluminate and silica in the proportions outlined in the said patent, when the invention is employed in making spark plug insulators. In this example it contained 88% $Al_2O_3$, 10% $3CaO.5 Al_2O_3$, 2% $SiO_2$ and some traces of MgO as impurity.

The mixture of ingredients was ground in a roll mill until all its parts were homogeneous, then it was placed in a circular mold and molded cold at a pressure of 2000–3000 #/sq.". Lower pressures, and even 20,000 #/sq." have been used but such great pressure is not usually needed. Temperatures up to 150° F. have been used when oil of sufficient stability is included; care is taken not to remove the lowest volatilizing hydrocarbon at this stage. The preforms thus made were stored for future use.

Figure 1:
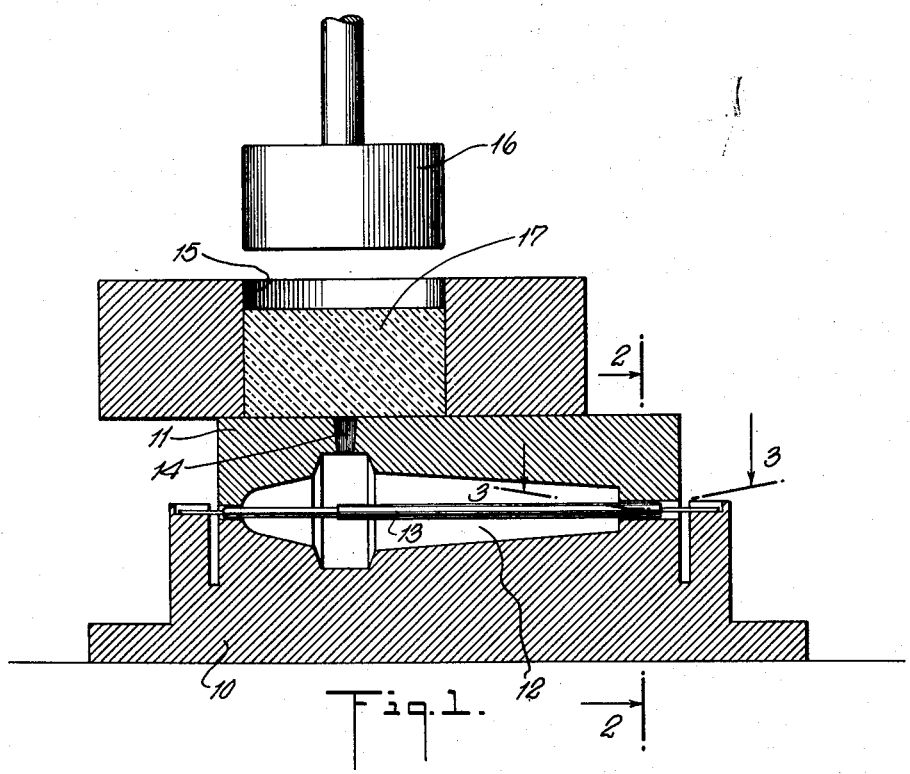
Figures 2, 3:
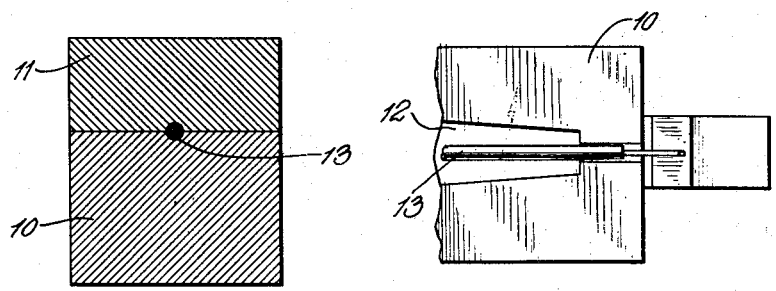
Fig. 2 is a section on the line 2—2 of Fig. 1.
Fig. 3 is a plan view on the line 3—3 of Fig. 1.
Figure 4:
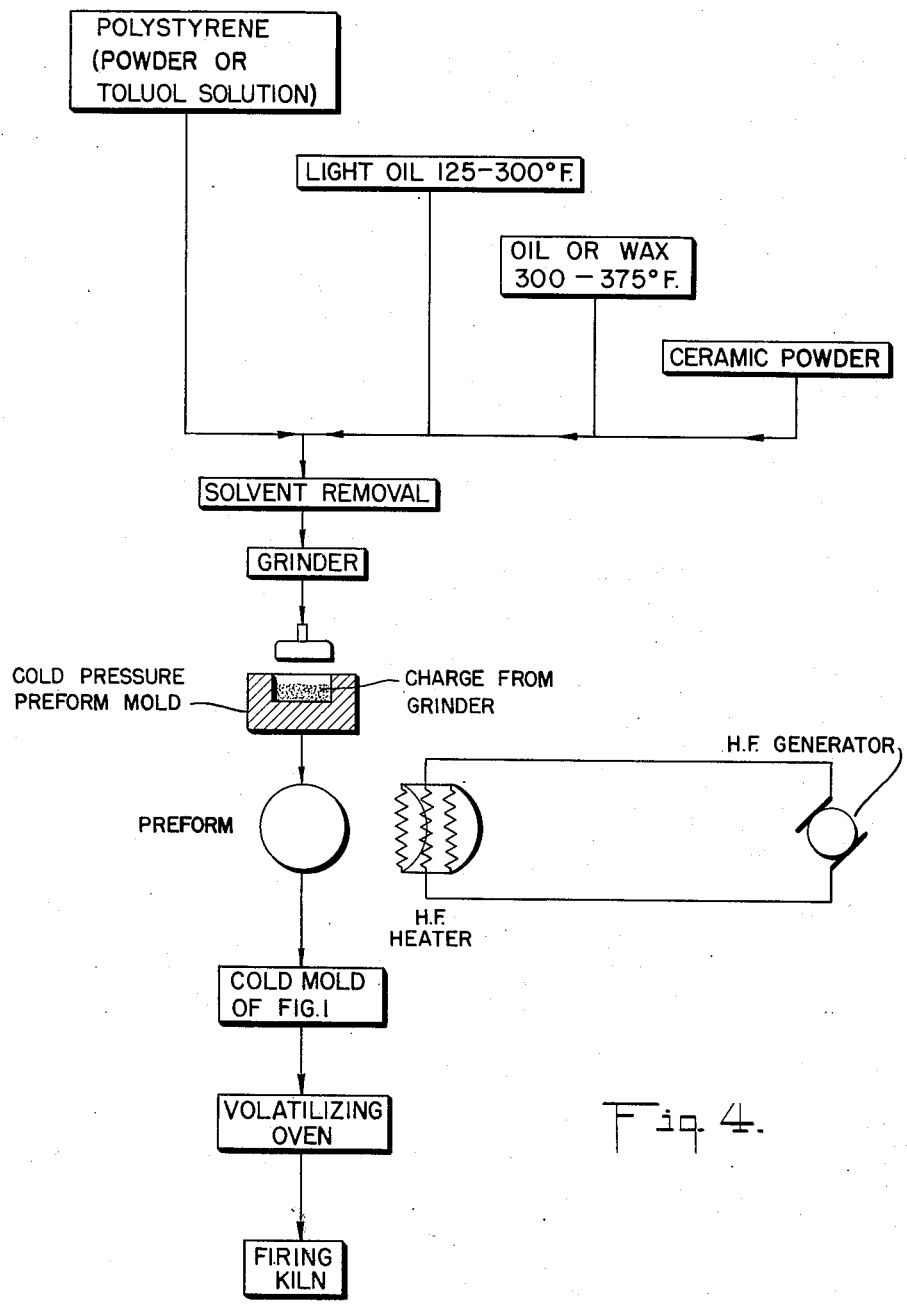
Fig. 4 is a flow sheet for the process.

In molding an insulator of the tubular type employed in spark plugs a cold mold was used and is diagrammatically shown in Fig. 1. In that figure, 10 is the lower mold part, 11 is the upper mold part, and 12 is the outline of the insulator formed by cooperating depressions in the mold parts. A mold core 13 is supported in the mold. Vents are provided at all parts remote from the inlet. It has been found to be preferable to allow some of the material to make its way out of the vents, thus allowing some relative movement between all particles of the ceramic throughout the molding operation. The upper mold part 11 has an injection port or sprue 14 communicating between the compression chamber 15 and mold 12. A plunger 16 forces the material of the preform 17 through the sprue 14.

The mold is vented at parts remote from the sprue. Thus, to fill the mold the mix must travel from the sprue in one direction toward one end of the mold and in another direction toward the opposite end. A vent is provided at the most remote places toward which these different motions tend. The vents are quite small, and do not harmfully reduce the internal pressure that forces the mix toward the walls of the mold. As a consequence, the particles of the mix may move relatively to each other right up to the end of the molding operation, and the filling in of fine contours is materially improved.

Just before the molding the preform was heated by high frequency to 300° to 350° F.; it was transferred quickly to the cold mold and compressed at 4500 or 5000 lbs./sq. in., slowly. The total pressure eventually applied was about 7½ tons.

The shape was taken from the mold and heated to remove the non-ceramic materials. Heating began at 125° F. and was raised to 450° F. in steps of about 25° each for 6 hours each. The light oil came off progressively between 125–300° F., the peanut oil came off progressively between 300–375° F., and the resin or its decomposition products at 400–450°. 75% removal of resin was deemed acceptable at this stage. The remainder was removed on firing, passing out through the established pores, which extended throughout the piece.

The shape was uniformly dense, free of fissures, and substantially free of spalling or surface blisters. After firing by known methods this shape had great strength. Before firing it had no tendency to deform when removing the mold insert. It is slightly less plastic and blisters less in the kiln than that of Example 2.

EXAMPLE 2

*Ingredients*

.45 part polystyrene.
.34 part light oil.
.11 part hydrogenated peanut oil.
3.00 parts alumina body, composed as in Example 1.

*Process*

It was treated exactly as in Example 1 for comparison, the differences being noted in that example.

EXAMPLE 3

*Ingredients*

.52 part polystyrene.
.10 part light oil
.09 part 600W oil to give additional spread during distillation.
.11 part hydrogenated peanut oil.
3.00 parts alumina body, composed as in Example 1.

*Process*

It was treated as in Example 1. It had even less surface spalling than the shape of Fig. 1 and required higher distillation temperature, being carried up to 1000° F.

Extrusion of the hot preform required one second.

EXAMPLE 4

An example was carried out exactly as in Example 1, but substituting .11 part of beeswax for the hydrogenated peanut oil of that example. The product was finer to the touch, freer of carbon traces, and less perfectly conformed to the details of the mold, although perfectly useful.

EXAMPLE 5

*Ingredients—Ceramic*

| | Pounds |
|---|---|
| Alumina | 39.6 |
| Tri calcium penta aluminate (including 1.9 lbs. water of hydration) | 6.4 |
| Silica | .9 |

*Binder*

| | Pounds |
|---|---|
| Polystyrene ground to ½" size | 6.09 |
| Toluene | 18.31 |
| Caloria oil (U. S. Patent No. 2,356,367) | 4.08 |
| Sterotex (hydrogenated edible vegetable oil, e. g., hydrogenated cottonseed or peanut oil) | 1.32 |

*Process*

Dry mix the powdered ceramic ingredients for circa 20 minutes in a mixer, such as a Simpson.

Mix the resin and toluene in a closed mixer until dissolved. Two hours is usually sufficient.

Add resin solution with agitation to the ceramic mix, in the mixer. Granulate to 8 mesh screen. Dry at 200° F. for three hours. Cool. Return to mixer and incorporate oil and sterotex. About ½ hour of mixing required. Granulate to pass 24 mesh screen.

The batch can be stored and used as described above and shown in the drawing.

Any ceramic can be molded by the new process.

Hydrogenated peanut oil is most completely satisfactory; it and beeswax are preferred.

Any light oil volatilizing in the range 120° F. to the volatilizing or disintegrating temperature of polystyrene is useful, but generally an oil or wax is chosen that gives off vapor only up to the temperature at which the next higher volatilizing oil or wax comes off.

The beeswax gives a product that is superior in some ways, for instance in producing a product freer of carbon smudges, but not in all ways, to the product produced with hydrogenated peanut oil, but it does not flow as freely or produce quite so perfect a conformation to fine mold lines under identical conditions. Nevertheless, these two substances are outstanding among all the useful oils and waxes, which are those that volatilize circa 300–375° F.

The use of heavier oils or waxes, volatilizing at temperatures on the border of or in the range of polystyrene removal is not generally recommended.

Some of the shapes contain traces of carbon, usually from the disintegration of polystyrene, after firing.

The principle of opening up the molded ceramic shape with volatile oils and waxes volatilizing in sequence is believed to be wholly new and it is, consequently, claimed broadly, and not solely in use with ceramic mixes containing polystyrene; it is useful to open up any ceramic mix containing a resinous binder, even though that resin is of nature inherently inferior to polystyrene, and even though the degree of success is not equal to or is superior to that with polystyrene.

The polystyrene is a binder and internal lubricant, the wax and peanut oil are mold and internal lubricants and pore openers, and the light oil is a pore opener for the shape. Each of these constituents has other functions not yet well undertsood.

The invention has been used to make elbows, thread guides and other shapes. Such shapes are superior in general appearance, in their properties, and are produced with a higher average of perfection than was heretofore possible. Losses due to excessive spalling are greatly reduced or eliminated, and losses due to formation of blisters and minute fissures are greatly reduced in comparison to prior known methods. The shapes are readily glazed.

As many apparently widely different embodiments of the present invention may be made without departing from the spirit and scope thereof, it is to be understood that the present invention is not limited to the specific embodiments, except as defined in the appended claims.

What is claimed is:

1. The method of making ceramic shapes that includes the steps of intimately mixing a composition including the ceramic, a minor proportion of polystyrene, a minor proportion of a member of the group consisting of oils and waxes volatilizing circa 300–375° F., a more volatile oil, heating the mixture below the temperature of removal of any of the ingredients, molding the hot mixture under pressure in a cold mold, heating the shape from 125° F. to 300° F. in six-hour steps of 25 degrees each, heating the shape from 300° F. to 350° F. in six-hour steps of 10 degrees each, heating from 350° F. to 450° F. in six-hour steps of 25 degrees each, and firing the shape.

2. The method of making ceramic shapes that includes the steps of intimately mixing a composition including the ceramic, a minor proportion of polystyrene, a minor proportion of hydrogenated peanut oil, a minor proportion of a more volatile oil, heating the mixture below the temperature of removal of any of the ingredients, molding the hot mixture under pressure in a cold mold, heating the shape gradually to 300° F. to open the pores, heating gradually to 375° F. to remove oil, heating to 450° F. to remove polystyrene, and firing the shape.

3. The method of making ceramic shapes that includes the steps of molding the ceramic under pressure in admixture with a heated thermoplastic and a plurality of members of the group consisting of oils and waxes volatilizing in sequence between about 125° F. and 375° F., and heating the molded shape gradually through the temperatures at which the volatilization occurs to a temperature at which the thermoplastic vaporizes.

4. The method of forming dense and porous molded ceramic shapes containing a thermoplastic that includes the step of mixing with the ceramic pore forming members of the class of oils and waxes volatilizing in sequence between the temperature of molding and that at which the thermoplastic is volatilized, and volatilizing and removing the class in sequence and thereafter volatilizing the thermoplastic at a higher temperature.

5. The method of making a molded ceramic product that comprises mixing with finely divided ceramic an inert material volatilizing progressively through a temperature range circa 125–300° F., an inert material volatilizing progressively through a temperature range circa 300–375° F., and polystyrene, heating the ceramic composition to a temperature below that at which the inert materials volatilize, molding the heated ceramic mix to a shape under pressure of thousands of pounds per square inch in a cold mold, and heating the molded shape progressively through the ranges of volatilization of the said inert materials and polystyrene until circa 75% of the polystyrene has been removed, and firing the ceramic product.

6. The method of making a molded ceramic product that comprises mixing with a finely divided ceramic material containing polystyrene as a binder, a pore forming material consisting essentially of inert organic substances from the class consisting of oils and waxes vaporizing progressively between about 125° F. and the temperature of polystyrene removal, molding the ceramic material, and heating it progressively from about 125° F. to the temperature of polystyrene removal.

7. A method of making a ceramic mass suited to the production of articles by extrusion molding that comprises mixing finely divided ceramic with polystyrene in organic solution in an organic solvent volatilizing at about 200° F., drying the mixture at about 200° F., incorporating therewith members of the class consisting of oils and waxes volatilizing in sequence between about 125° and 375° F., and forming a shape therefrom at a temperature below the volatilizing temperature of the said members.

8. The method of making ceramic shapes that includes the steps of intimately mixing a composition including the ceramic, a minor proportion of polystyrene, and minor proportions of hydrogenated peanut oil and of a more volatile oil, heating the mixture below the temperature of removal of any of the ingredients, molding the hot mixture under pressure in a cold mold, heating the shape from 125° F. to 300° F. in six-hour steps of 25° each, heating the shape from 300° F. to 350° F. in six-hour steps of 10° each, heating from 350° F. to 450° F. in six-hour steps of 25° each, and firing the shape.

9. The method of making ceramic shapes that includes the steps of intimately mixing a composition including the ceramic, a minor proportion of polystyrene, and minor proportions of hydrogenated peanut oil and of a more volatile oil, heating the mixture below the temperature of removal of any of the ingredients, molding the hot mixture under pressure in a cold mold, heating the shape gradually to 300° F. to open the pores, heating gradually to 375° F. to remove oil, heating to 450° F. to remove polystyrene, and firing the shape.

10. A method of making a ceramic article that includes the steps of molding three parts of finely divided ceramic comprising about 88% alumina, 10% tricalcium penta aluminate, plus a minor proportion of adjuvants including .52 part polystyrene, .11 part hydrogenated peanut oil, .27 parts of more volatile oil volatilizing between 125 and 300° F., extruding the preform into a mold vented at a point remote from the point of extrusion, heating the molded shape to the temperature at which the said more volatile oil escapes, until its escape has been substantially completed, raising the temperature to that at which the peanut oil vaporizes until its escape has been substantially completed, raising the temperature to that at which polystyrene is removed until the polystyrene has been removed, and firing the shape at the sintering temperature of the ceramic.

11. The method of making a ceramic article that includes the steps of molding a major proportion of finely divided ceramic material with a minor proportion of adjuvants consisting of polystyrene, hydrogenated peanut oil, and a more volatile oil into a preform, extruding a preform into a mold vented at a point remote from the point of extrusion, heating the molded shape to the temperature at which the said more volatile oil escapes, until its escape has been substantially completed, raising the temperature to that at which the peanut oil vaporizes until its escape has been substantially completed, raising the temperature to that at which polystyrene is removed until the polystyrene has been removed, and firing the shape at the sintering temperature of the ceramic.

12. A ceramic extrusion mass including finely divided ceramic, and mixed therewith polystyrene, hydrogenated peanut oil, and a light oil volatilizing below said peanut oil.

13. A ceramic extrusion mass including finely divided ceramic comprising alumina, a binder comprising polystyrene, hydrogenated peanut oil, and a light, lower volatilizing oil.

14. A ceramic extrusion mass including finely divided alumina, about 13.34% of the weight thereof polystyrene, about 6.92% of the weight thereof light oil, vaporizing below the vaporizing temperature of hydrogenated peanut oil, and about 2.82% of the weight thereof hydrogenated peanut oil.

15. A preform consisting essentially of a major proportion of ceramic material in finely divided condition and a minor proportion of adjuvants consisting of polystyrene, hydrogenated peanut oil and a more volatile oil.

16. A preform that includes a major proportion of finely divided ceramic material, and a minor proportion of adjuvants including as essential constituents polystyrene and hydrogenated peanut oil.

17. The method of making a ceramic article that includes the steps of extruding finely divided and intimately mixed tricalcium penta aluminate and polystyrene and a plurality of oils volatilizing substantially continuously throughout the range of 125 to 375° F. into a vented mold, heating the molded shape until the volatile oils have escaped, heating the molded shape until the polystyrene has escaped, and firing the ceramic product.

18. A ceramic extrusion mass including finely divided ceramic, and mixed therewith polystyrene, an oil having a range of volatilization of which the upper limit is about the temperature at which polystyrene begins to volatilize, and a light oil volatilizing below said oil having a range of volatilization of which the upper limit is about the temperature at which the said oil begins to volatilize and an initial temperature of volatilization about 125 to 150° F.

19. The method of making a ceramic article that includes the steps of shaping finely divided ceramic and thermoplastic resin intermixed with a plurality of oils, the first oil having a range of volatilization of which the upper limit is about the temperature at which the thermoplastic resin begins to volatilize, the second oil having a range of volatilization of which the upper limit is about the temperature of which the first oil begins to volatilize and an initial temperature of volatilization about 125 to 150° F.

20. A ceramic extrusion mass consisting essentially of ceramic material in finely divided condition and a minor proportion of adjuvants consisting essentially of polystyrene as a binder and pore forming materials from the class consisting of oils and waxes having vaporizing points in a sequence extending from about 125° F. to about 300–375° F.

21. The preform of claim 20 in which the pore forming material includes beeswax.

22. The preform of claim 20 in which the pore forming material includes hydrogenated peanut oil.

23. The method of claim 4 in which the said class includes hydrogenated peanut oil.

24. The method of claim 4 in which the said class includes beeswax.

References Cited in the file of this patent

UNITED STATES PATENTS

| Number | Name | Date |
|---|---|---|
| 560,049 | Stewart | May 12, 1896 |
| 1,598,201 | Koppitz | Aug. 31, 1926 |
| 2,039,734 | Meder et al. | May 5, 1936 |
| 2,408,297 | Cubberley et al. | Sept. 24, 1946 |
| 2,434,271 | Howatt | Jan. 13, 1948 |
| 2,442,810 | Haas | June 8, 1948 |
| 2,446,872 | Ehlers | Aug. 10, 1948 |